US011835474B2

(12) United States Patent
Joensen et al.

(10) Patent No.: US 11,835,474 B2
(45) Date of Patent: Dec. 5, 2023

(54) X-RAY SCATTERING APPARATUS

(71) Applicant: XENOCS SAS, Grenoble (FR)

(72) Inventors: Karsten Joensen, Holyoke, MA (US); Peter Hoghoj, Grenoble (FR); Ronan Mahe, Grenoble (FR)

(73) Assignee: XENOCS SAS, Grenoble (FR)

(*) Notice: Subject to any disclaimer, the term of this patent is extended or adjusted under 35 U.S.C. 154(b) by 0 days.

(21) Appl. No.: 17/783,183

(22) PCT Filed: Dec. 29, 2020

(86) PCT No.: PCT/EP2020/087964
§ 371 (c)(1),
(2) Date: Jun. 7, 2022

(87) PCT Pub. No.: WO2021/136771
PCT Pub. Date: Jul. 8, 2021

(65) Prior Publication Data
US 2023/0012833 A1    Jan. 19, 2023

(30) Foreign Application Priority Data

Dec. 30, 2019  (EP) .................................... 19290126
Sep. 21, 2020  (EP) .................................... 20197189

(51) Int. Cl.
*G01N 23/201* (2018.01)
*G01N 23/041* (2018.01)
*G01N 23/207* (2018.01)

(52) U.S. Cl.
CPC ......... *G01N 23/041* (2018.02); *G01N 23/201* (2013.01); *G01N 23/207* (2013.01); *G01N 2223/054* (2013.01); *G21K 2201/067* (2013.01)

(58) Field of Classification Search
CPC .. G01N 23/041; G01N 23/201; G01N 23/207; G01N 2223/054; G01N 23/20008;
(Continued)

(56) References Cited

U.S. PATENT DOCUMENTS 5,245,648 A * 9/1993 Kinney .................... G21K 7/00
378/85
7,035,373 B2 * 4/2006 Omote ..................... G21K 1/06
378/81
(Continued)

FOREIGN PATENT DOCUMENTS

EP    1462795 A2    9/2004
EP    3190593 A2    7/2017
(Continued)

OTHER PUBLICATIONS

International Search Report and Written Opinion for corresponding PCT application No. PCT/EP2020/087964, dated Mar. 19, 2021.

*Primary Examiner* — David P Porta
*Assistant Examiner* — Mamadou Faye
(74) *Attorney, Agent, or Firm* — Notaro, Michalos & Zaccaria P.C.

(57) ABSTRACT

An X-ray scattering apparatus having a sample holder for aligning and/or orienting a sample to be analyzed by X-ray scattering, a first X-ray beam delivery system having a first X-ray source, and a first monochromator being arranged upstream of the sample holder for generating and directing a first X-ray beam along a beam path in a propagation direction towards the sample holder is disclosed. A distal X-ray detector arranged downstream of the sample holder and being movable, in particular in a motorized way, along the propagation direction as to detect the first X-ray beam and X-rays scattered at different scattering angles from the sample as the first X-ray beam delivery system is configured to focus the first X-ray beam onto a focal spot on or near the
(Continued)

distal X-ray detector when placed at its largest distance from the sample holder is also disclosed.

7 Claims, 6 Drawing Sheets

(58) Field of Classification Search
CPC ....... G01N 23/20083; G21K 2201/067; G21K 1/06
See application file for complete search history.

(56) References Cited

U.S. PATENT DOCUMENTS

| | | | |
|---|---|---|---|
| 2006/0062351 A1* | 3/2006 | Yokhin | G01N 23/20008 378/86 |
| 2015/0051877 A1* | 2/2015 | Bakeman | G01N 23/223 703/1 |
| 2019/0170669 A1* | 6/2019 | Hoghoj | G01N 23/20 |
| 2019/0348257 A1* | 11/2019 | Hunt | H01J 37/22 |

FOREIGN PATENT DOCUMENTS

| | | |
|---|---|---|
| EP | 3246695 A1 | 11/2017 |
| JP | H07301700 A | 11/1995 |

* cited by examiner

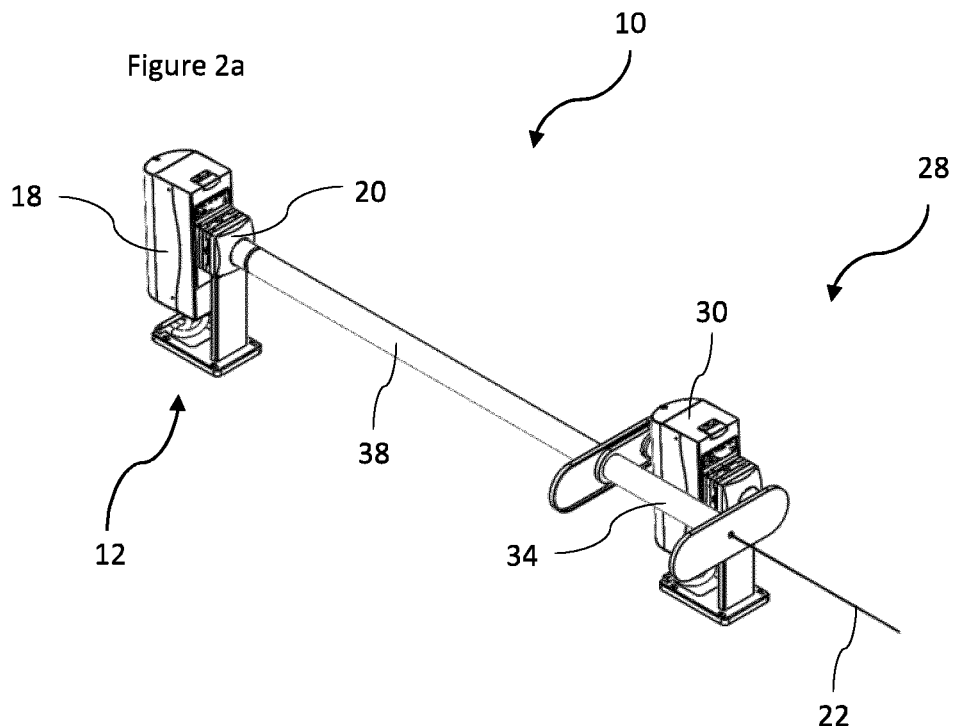
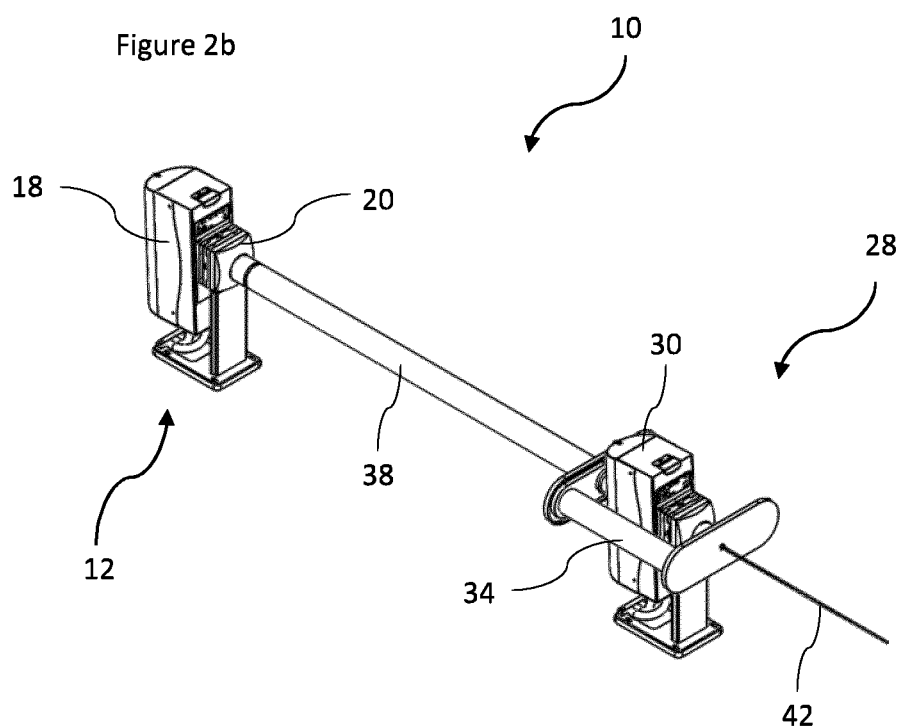

Figure 5
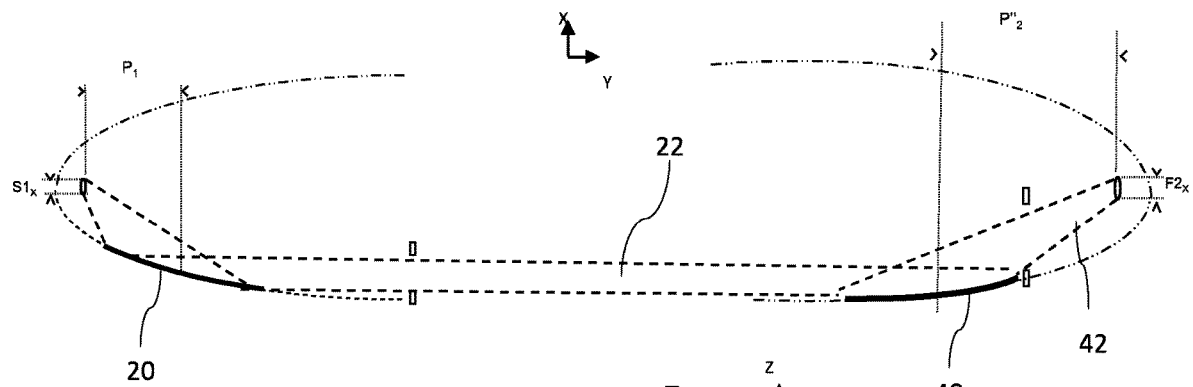
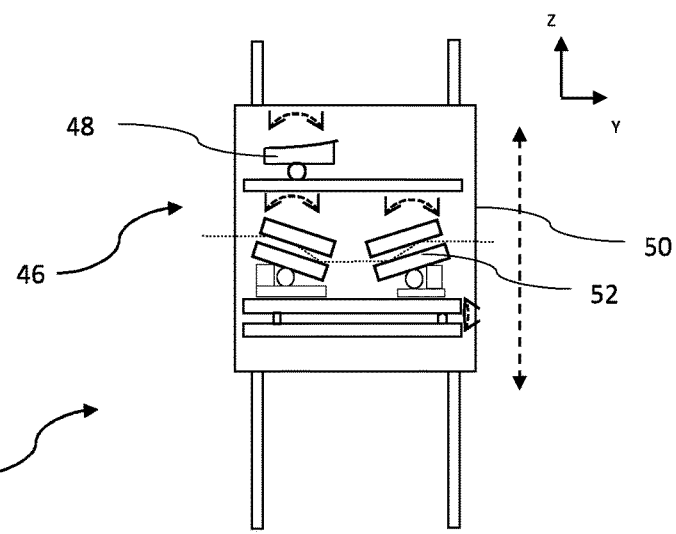
Figure 6
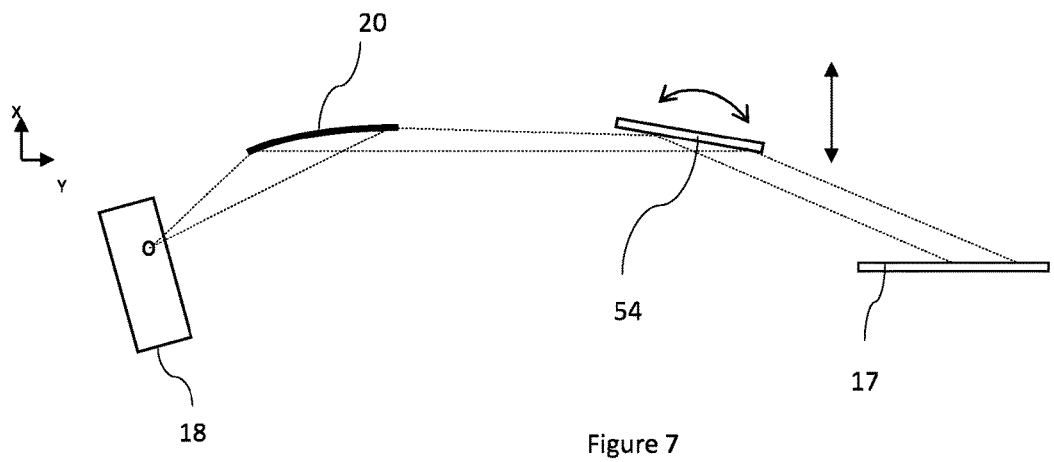
Figure 7

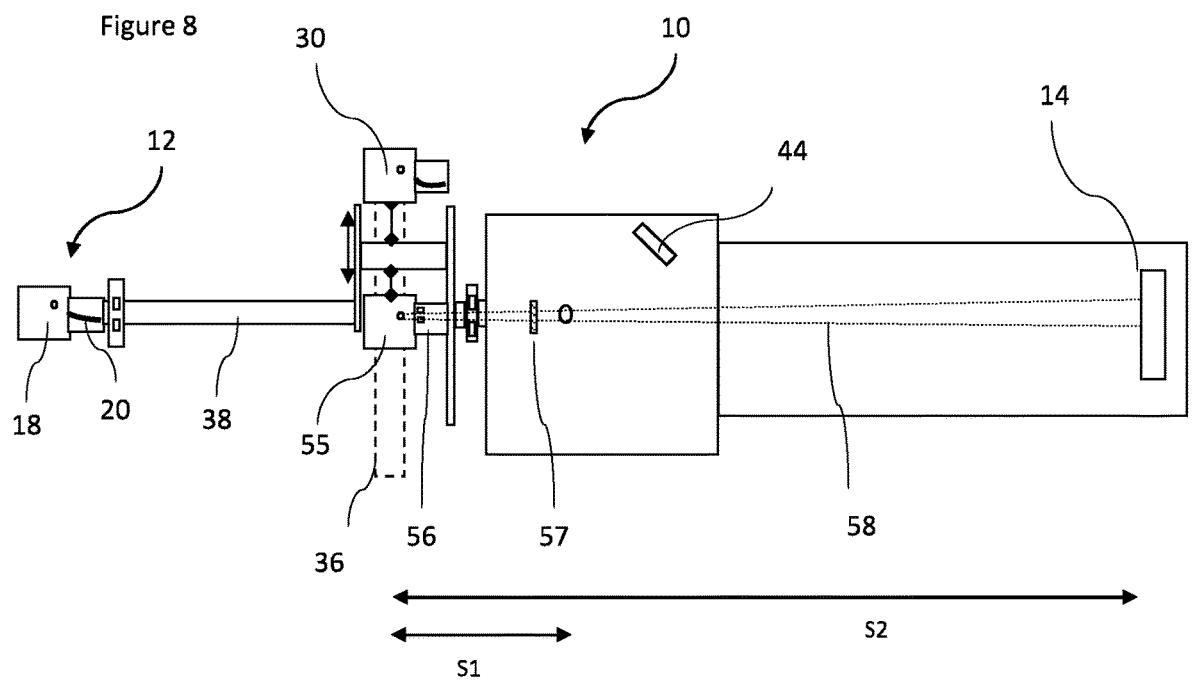

X-RAY SCATTERING APPARATUS

The present invention relates to an X-ray scattering apparatus.

Typically X-ray scattering and X-ray diffraction instruments include
1) a source
2) a wavelength selector (monochromator)
3) a collimation section (defining the beam direction and removing residual background scattering or divergence)
4) a sample area
5) and a detector area.

In the years since X-ray analysis was employed there has been a tremendous development of the individual components driven by the need for faster measurements and better data quality, in turn providing characterization answers for a larger and larger group of structured and quasi-structured samples.

In addition, various highly specialized diffraction and scattering geometries have been developed to extract more particular information, for example
1) X-ray Powder Diffraction
    a. Bragg-Brentano Reflection
    b. Guinier Transmission
2) Single Crystal Diffraction (Transmission)
3) Back-Reflection Laue
4) Grazing Incidence X-ray Diffraction
5) X-Ray reflectivity
6) Texture
7) Small Angle X-ray Scattering (Transmission)
8) Wide Angle X-Ray Scattering (Transmission)
9) Bonse-Hart Ultra Smart Angle Scattering In order to make the most of the instrument investment, several X-ray scattering apparatus allow an easy switch between the different configurations. As an example, switching wavelengths by changing source anode material, e.g. the Xenocs Dual-Source SAXS, or switching techniques by changing collimation components can be mentioned. So with only a small additional cost one can reoptimize the instrument for a completely new scattering or diffraction application.

Material science and development requires structure characterization over large length scales to study the hierarchical structure impact on material function. Complex materials would exhibit more or less structured entities depending on the length scale. Moreover the development of new materials would require in-situ characterization depending on external parameters, or in-operation structural characterization. Nano-structured materials with a structure typically in the length scale of 1 to 150 nm can be characterized with Small Angle X-ray Scattering (SAXS) at scattering angles ranging typically from 0.05° to 10° when two phases with sufficient electron density contrast are present by analyzing the intensity of the X-ray beam elastically scattered by the sample. The technique has been widely used for soft matter characterization, e.g. in the field of polymers, colloids or proteins in solutions.

New materials characterization requires combination with Wide Angle X-ray Scattering (WAXS) to characterize crystalline structure, and most SAXS characterization instruments combine SAXS/WAXS and USAXS (Ultra-Small Angle X-ray Scattering) to probe structures from typically 1 Å to few microns, e.g. using a USAXS Bonse-Hart configuration to measure scattering profiles in 1 direction only.

In other words, while Wide Angle X-ray Scattering (WAXS) typically gives access to information on crystallinity and crystalline phase(s) of a sample to be analyzed, Small Angle X-ray Scattering (SAXS) typically gives access to information about the sample structure on the nano-scale level (nano-structure). As both crystalline phase and nano-structure influence material properties, there is an interest in performing both SAXS and WAXS on the same sample and on the same instrument.

However, while most of the X-ray techniques of interest mentioned above can optimally be configured in fairly compact instrumentation suitable for tabletop applications or at most smaller laboratory instrumentation of a footprint less than 2 m by 2 m, that is not the case for SAXS instrumentation, where long instruments (3 m to 10 m) consistently provide a better combination of resolution and intensity. Shorter instruments provide less intensity at the highest resolution desired in SAXS and consequently instrumentation stays long.

Nevertheless, recent developments have begun to couple traditional SAXS with other configurations such as Bonse-Hart Ultra-Small-Angle X-ray Scattering, Grazing Incidence Diffraction, Wide Angle X-ray Scattering, as well as Powder and Texture analysis.

In order to carry out SAXS and WAXS measurements on the same sample and instrument, an X-ray scattering apparatus, comprising:
  a sample holder for aligning and/or orienting a sample to be analyzed by X-ray scattering;
  a first X-ray beam delivery system comprising a first X-ray source and a first monochromator and being arranged upstream of the sample holder for generating and directing a first X-ray beam along a beam path in a propagation direction towards the sample holder;
  a distal X-ray detector arranged downstream of the sample holder and being movable, in particular in a motorized way, along the propagation direction such as to detect the first X-ray beam and X-rays scattered at different scattering angles from the sample;
  wherein the first X-ray beam delivery system is configured to focus the first X-ray beam onto a focal spot on or near the distal X-ray detector when placed at its largest distance from the sample holder or to produce a parallel beam,
  is commercially available from the applicant under the name "Xeuss 3.0".

The first X-ray beam delivery system of this conventional X-ray scattering apparatus comprises a first X-ray source, for example a source with Cu or Mo anode for generating X-rays, and an optics and collimation system including a first monochromator for directing and conditioning the generated first X-ray beam along the essentially horizontal propagation direction towards the sample holder which may comprise a motorized translation and/or rotation stage and other typical sample stage devices known in the field of X-ray scattering and may be positioned in a vacuum chamber.

This conventional X-ray scattering apparatus comprises at least one X-ray detector which is arranged downstream of the sample holder, i.e. on a side of the sample holder opposite to the side of the first X-ray beam delivery system:

A distal X-ray detector is normally mounted on a detector stage which allows for translation along the propagation direction of the direct beam over large horizontal distances from the sample holder, typically in a range between 50 mm and 1000 mm or larger, e.g. up to 5000 mm. Depending on the positional details of the distal X-ray detector and the size of its sensor, it is typically able to detect X-rays scattered from the sample at scattering angles with respect to the direct X-ray beam as small as approximately 2θ=0.05° and as large as 60° to 70°. The distal X-ray detector is thus suitable for Small Angle X-ray Scattering (SAXS) providing information on the sample structure at the nano-scale level and Wide Angle X-ray Scattering (WAXS) providing information on sample crystallinity.

However, the X-ray optical scheme for optimum SAXS does not provide optimum conditions for WAXS measurements. For example, the long collimation provides for a beam with low divergences and in some cases planned to focus at a typical SAXS distance 3 to 8 meters from the first X-ray source corresponding to 1 to 5 meters from the sample. However, for WAXS the detector is much closer, so basically out-of-focus with a beam larger than at the focus. Further, even for a focused beam the focus size SF follows the lens equation SF=M*S; M=P2/P1 where M is the magnification factor, S is the source size, P1 is the distance between the source and the optic or monochromator and P2 is the distance between the optic and the focus. For the long SAXS collimation M is usually >10 and achieving a small spot size becomes impossible unless the apertures are very small which reduces the intensity significantly. A similar problem occurs with collimating mirrors which typically make use of a beam size in the order of 0.5 to 1 mm$^2$ to achieve sufficient intensity and resolution in SAXS.

A similar problem exists for scattering applications that require a small exposed area on the sample while tolerating lesser resolution, such as for applications where a sample is scanned or where the sample volume is required to be small due to the sample environment such as inside the channel of a microfluidic chip. Here again the long collimation lengths and the lens equation put an insufficient lower limit on the beam-size that can be achieved without cutting most of the intensity away with apertures.

Mechanically and manually reconfiguring the X-ray scattering apparatus to change components and relative distances, such as moving the first X-ray source closer to the sample, is problematic in view of the time necessary to reconfigure and realign the system.

It is therefore an object of the invention to propose an improved X-ray scattering apparatus of the above type that allows to provide optimum conditions for SAXS and WAXS measurements, respectively.

According to the invention this object is achieved by an X-ray scattering apparatus of the above conventional type, which is characterized in that the X-ray scattering apparatus furthermore comprises a second X-ray beam delivery system configured to focus a second X-ray beam onto a focal spot on or near the sample holder. This setup allows to use the first X-ray beam generated by the first X-ray beam delivery system for SAXS measurements, whereas the second X-ray beam obtained by means of the second X-ray beam delivery system is used for WAXS measurements including high resolution WAXS measurements or for small sample exposed area scattering applications (hereinafter referred to as high spatial resolution applications).

When the distal X-ray detector is placed close to the sample it allows to perform WAXS measurements up to a certain maximum scattering angle which, however, requires moving the distal detector along the propagation direction (Y). For applications requiring a simultaneous SAXS and WAXS measurement like in situ measurements or for WAXS applications requiring a measurement at very wide angles up to 90°, the X-ray scattering apparatus according to the invention preferably furthermore comprises a proximal X-ray detector arranged downstream of the sample holder such as to let the first X-ray beam pass and detect X rays scattered from the sample. The proximal X-ray detector can be either a fixed detector fixed at a distance from approximately 80 to 150 mm along the first X-ray beam propagation direction (Y) or a motorized detector so that the detector can move along the surface of the Ewald Sphere to measure scattering patterns scattered at wide angles either in the plane of incidence (YZ) or in a transversal direction. When motorized the proximal X-ray detector could also be equipped with an additional rotation stage to keep its surface perpendicular to an incoming beam direction.

In a first embodiment of the invention the second X-ray beam delivery system comprises a second X-ray source and a second monochromator. They allow to produce the second X-ray been completely independently from the first X-ray beam and focus it onto or near the sample holder.

In a preferred example of this first embodiment the X-ray scattering apparatus furthermore comprises an insertion module configured to move the second X-ray beam delivery system into the first X-ray beam at a position upstream of the sample holder. The insertion module then allows for a computer controlled movement of the second X-ray beam delivery system avoiding any manual interaction by a user.

In this case the X-ray scattering apparatus preferably furthermore comprises a main collimation tube extending along the beam path from a position downstream the first X-ray beam delivery system to a position upstream the sample holder, wherein the insertion module comprises a motorized platform configured to alternatively position the second X-ray beam delivery system or a collimation tube extension into the beam path at a position between the main collimation tube and the sample holder. For SAXS measurements the collimation tube extension is then positioned in the beam path allowing the first X-ray beam to serve as the direct beam that impinges onto the sample mounted on the sample holder. For WAXS or high spatial resolution scattering measurements, however, the second X-ray beam delivery system is positioned in the beam path by means of the motorized platform. The control system of the X-ray scattering apparatus can then activate a shutter of the first X-ray beam delivery system to block the first X-ray beam while activating a shutter of the second X-ray beam delivery system so that the second X-ray beam is focused onto or near the sample holder by means of the second monochromator.

Preferably the downstream end of the main collimation tube and the upstream end of the collimation tube extension are provided with respective connection elements for vacuum-tight connection. This allows to essentially keep the beam path in vacuum all the way from the first X-ray beam delivery system to the sample holder when the collimation tube extension is positioned in the beam path during SAXS measurements.

Preferably the collimation tube extension is provided with a retraction/expansion mechanism. The collimation tube extension can then be retracted and expanded for example by a telescope mechanism. In the retracted condition the collimation tube extension can easily be inserted between the main collimation tube and the sample holder by reducing the friction and contact with the mechanical elements in contact during movement of the motorized platform holding the collimation tube extension. As soon as the collimation tube extension has reached its final position in the beam path, it can then be expanded until getting in contact with the main collimation tube and/or the vacuum chamber in which the sample holder is located or any other optical component arranged upstream the vacuum chamber.

In a second embodiment of the invention, the second X-ray beam delivery system comprises an optic module and a positioning module configured to position the optic module into the first X-ray beam at a position upstream of the sample holder, wherein the optic module is configured to convert the first X-ray beam into a second X-ray beam focused onto a focal spot on or near the sample holder. Whereas in the first embodiment of the invention, the first X-ray beam is essentially blocked by a shutter of the first X-ray beam delivery system when using the second X-ray beam delivery system, the second embodiment of the invention converts the first X-ray beam into the second X-ray beam having a different focus, namely a focal spot on or near the sample holder.

In a preferred example of the second embodiment, the positioning module comprises a vacuum-fit motorized holder configured to hold the optic module. This allows to arrange the positioning module inside the main collimation tube that extends essentially from the first X-ray beam delivery system.

In a particularly versatile version of this preferred example the positioning module is configured to alternatively position the optic module or a channel cut monochromator into the first X-ray beam at a position upstream of the sample holder. The channel cut monochromator can be part of a Bonse-Hart module that furthermore includes an additional channel cut analyzer placed downstream of the sample holder.

In a preferred example of the first or the second embodiment the X-ray scattering apparatus according to the invention furthermore comprises a first and a second slit module located upstream of the sample holder, wherein the second slit module is located downstream of the second X-ray beam delivery system, wherein a distance between the second slit module and the second X-ray beam delivery system amounts to 5 cm or less. The first and the second slit module can be used in combination to shape the first X-ray beam. The second slit module can furthermore be used to shape the second X-ray beam.

Preferred embodiments of the X-ray scattering apparatus according to the invention will be described in the following with reference to the attached drawings, in which:

FIG. 2a shows a perspective view of a part of the X-ray scattering apparatus of FIG. 1a upstream of a sample holder;

FIG. 2b shows a perspective view of a part of the X-ray scattering apparatus of FIG. 1b upstream of the sample holder;

FIG. 3a shows a top view of the X-ray scattering apparatus of FIG. 2a;

FIG. 4a shows an enlarged perspective view of a second X-ray beam delivery system of the X-ray scattering apparatus of FIG. 1a;

FIG. 5 shows a schematic representation of a first monochromator and an optic module used in the second embodiment of the invention;

FIG. 6 shows a schematic side view of a positioning module used in the second embodiment of the invention;

FIG. 7 shows a schematic top view of another example of the invention using an additional X-ray mirror; and FIG. 8 shows a top view of a modification of the first embodiment equipped with two second X-ray sources.

Figure 1A:
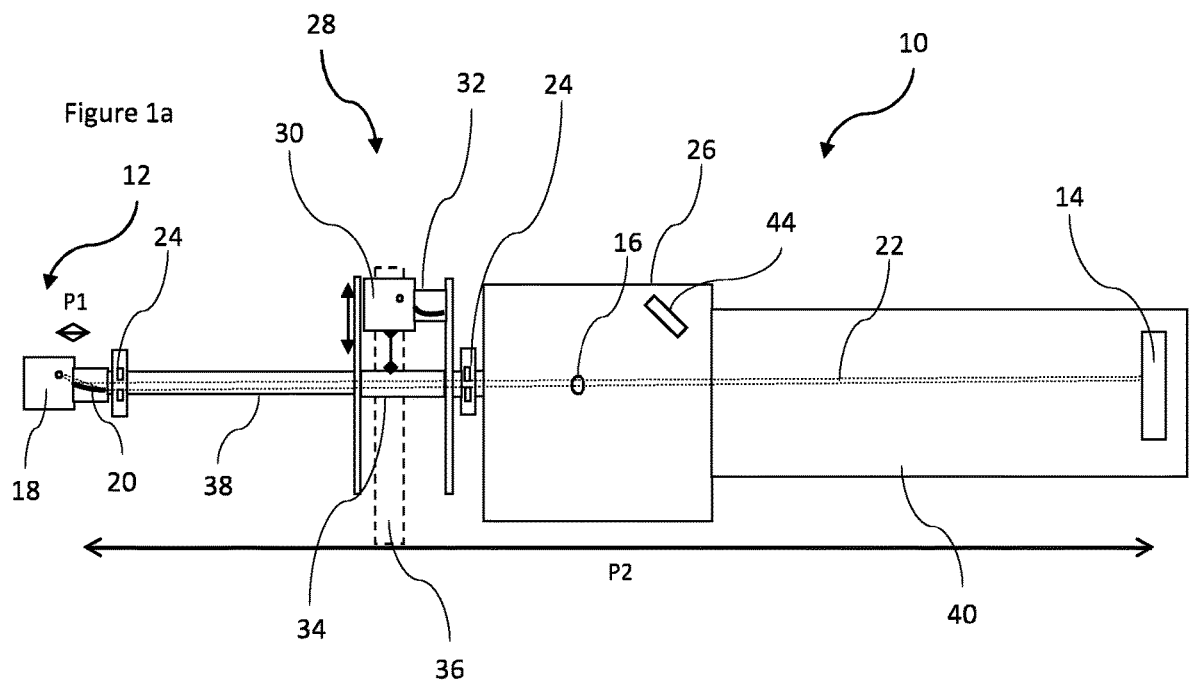
FIG. 1a shows a schematic top view of a first embodiment of an X-ray scattering apparatus according to the invention in a configuration for SAXS measurements.
Figure 3A:
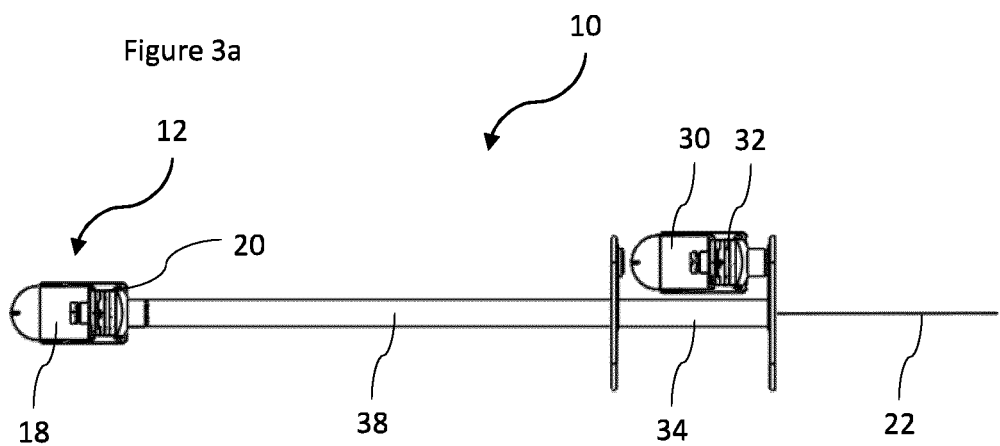

FIG. 1a shows a schematic top view of a first embodiment of an X-ray scattering apparatus 10 according to the invention in a configuration for SAXS measurements. The apparatus 10 is shown from its upstream end at the first X-ray beam delivery system 12 down to its downstream end at a distal X-ray detector 14. FIG. 2a shows a perspective view of a part of the apparatus 10 upstream of a sample holder 16, and FIG. 3a shows a top view of the X-ray scattering apparatus 10 of FIG. 2a.

Figure 1B:
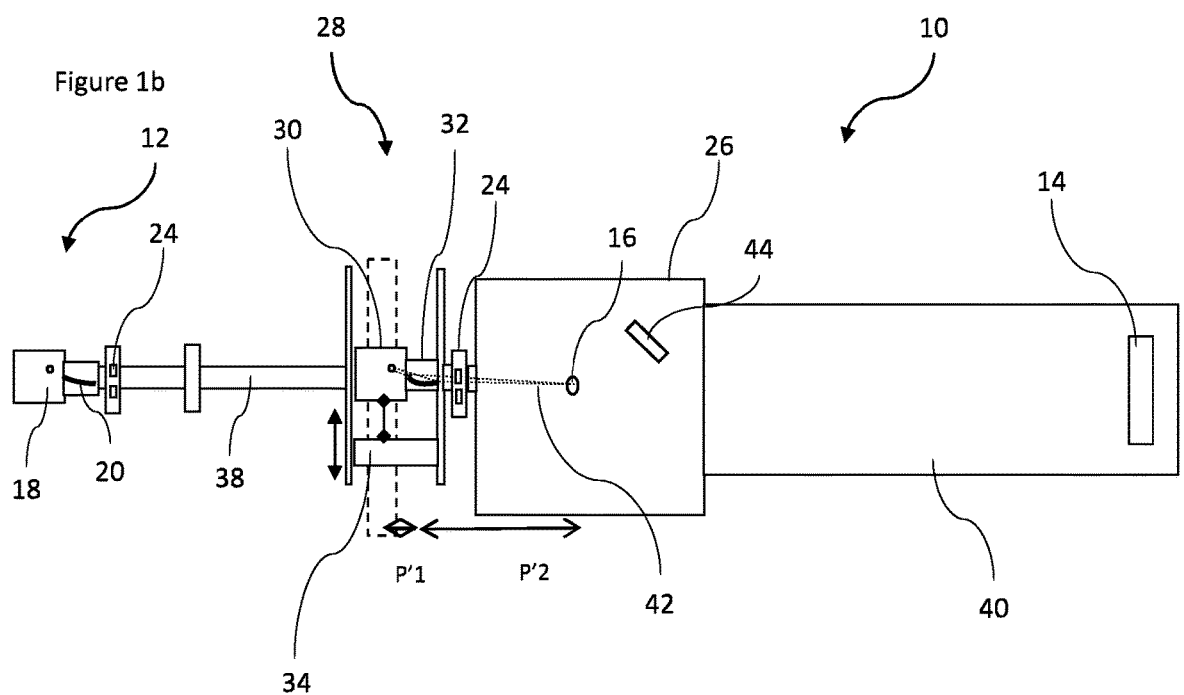
FIG. 1b shows a schematic top view of the X-ray scattering apparatus of FIG. 1a in a configuration for WAXS measurements.
Figure 3B:
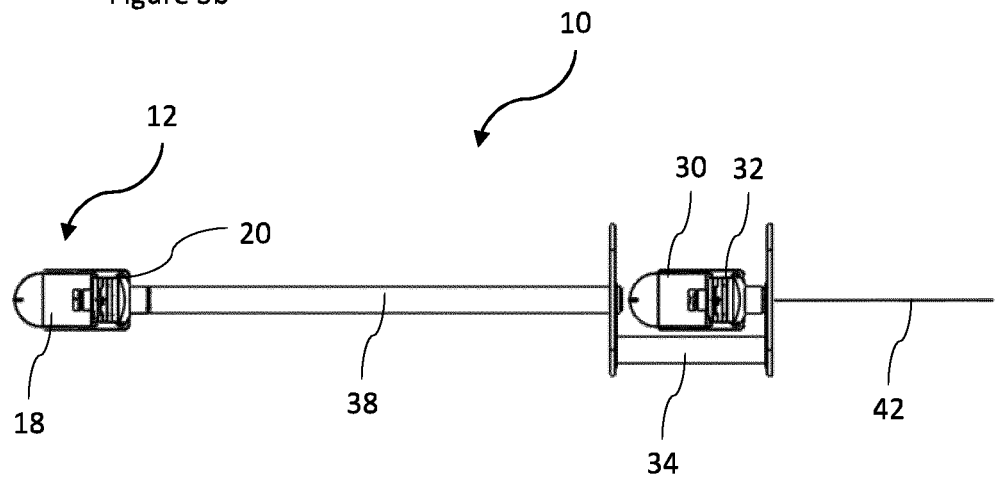
FIG. 3b shows a top view of the X-ray scattering apparatus of FIG. 2b.

FIGS. 1b, 2b and 3b show the respective views when the first embodiment of the X-ray scattering apparatus 10 is placed in its configuration for WAXS measurements. This configuration may in particular be used for high resolution WAXS measurements but also for high spatial resolution SAXS measurements.

In all top views shown in the figures, the upstream end of the X-ray scattering apparatus 10 is at the left and the downstream end is at the right. The propagation direction Y of the first X-ray beam and the second X-ray beam is therefore from left to right.

Furthermore the propagation direction Y is assumed to be horizontal in the laboratory system. The horizontal direction perpendicular to Y is called an X direction, and a vertical direction perpendicular to X and Y is called a Z direction.

The first X-ray beam delivery system 12 comprises a first X-ray source 18 and a first monochromator 20. As indicated by dotted lines in FIG. 1a, the first monochromator 20 is chosen and set such as to collect X-rays generated by the first X-ray source 18 and focus them as a first X-ray beam 22 onto a focal spot on or near the distal X-ray detector 14 when the distal X-ray detector 14 is placed at its largest distance in the Y direction from the sample holder 16. In this context "near" means that the distance between the focal spot of the first X-ray beam 22 and the distal X-ray detector 14 is approximately 20% of the distance P2 (indicated by a double arrow in FIG. 1a) between the focal spot and the first monochromator 20. The focal spot can be before (i.e. upstream) or after (i.e. downstream) the distal X-ray detector 14. Alternatively, it is also possible for the first monochromator 22 to produce an essentially parallel beam.

The first X-ray source 18 is preferably a point focus source, and the first monochromator 20 is preferably a point focus monochromator.

The beam shape can be further defined by means of slit modules 24 that are preferably of the "scatterless" or "scatterfree" type. In FIG. 1a two such slit modules 24 are shown, a first one immediately downstream of the first monochromator 20 and a second one immediately upstream of a vacuum chamber 26. This vacuum chamber 26 accommodates the sample holder 16 that may comprise a motorized translation and/or rotation stage and other typical sample stage devices known in the field of X-ray scattering.

Upstream and close to the second slit module 24 the X-ray scattering apparatus 10 comprises a second X-ray beam delivery system 28 that includes a second X-ray source 30 and an associated second monochromator 32 as well as a collimation tube extension 34. The distance between the second slit module 24 and the second X-ray beam delivery system 28 typically amounts to a few centimeters, preferably 5 cm or less. The second X-ray source 30, the second monochromator 32 and the collimation tube extension 34 are mounted on an insertion module having a motorized platform 36 schematically indicated by a dashed line in FIG. 1a.

In the SAXS configuration of the first embodiment of the X-ray scattering apparatus 10, as shown in FIGS. 1a, 2a and 3a, the motorized platform 36 is moved to a position such that the collimation tube extension 34 is aligned with a main collimation tube 38 extending downstream of the first slit module 24. The first X-ray beam 22 then propagates along the Y direction through the main collimation tube 38 and the subsequent collimation tube extension 34 that can both be evacuated as known in the field of X-ray scattering. The first X-ray beam 22 enters the vacuum chamber 26 which preferably is in the same evacuated environment as the main collimation tube 38 and hits a sample mounted on the sample holder 16. The first X-ray beam 22 transmitted as a direct beam as well as SAXS signals generated by the sample exit the vacuum chamber 26 through corresponding exit ports and are detected by the distal X-ray detector 14 located near the distal end of a further evacuated tube 40 downstream of the vacuum chamber 26.

In order to be able to measure sample structures larger than 200 nm in size the distal X-ray detector 14 is usually placed at a distance from the sample holder 16 of at least 1 m, preferably more than 1.5 m and up to 4 or 6 m.

The first monochromator 20 is typically a multilayer X-ray monochromator, preferably adapted to condition the beam in two directions to either focus the beam at a large distance at the furthest position of the distal X-ray detector 14 when placed in the SAXS measuring position enabling to achieve the highest resolution, i.e. to measure the largest characteristic dimension or detect the smallest angle of scattering. Alternatively, the first monochromator 20 focuses at a much larger distance, thus having a very low divergence, or produces a parallel beam (equivalent to focus at infinite), i.e. with a residual divergence <0.2 mradians. The first monochromator 20 is shaped in order to produce a 2D beam conditioning, i.e. it is shaped as an ellipsoid of revolution (if focusing the beam) or paraboloid of revolution (if collimating the beam) or made of two 1D mirrors cross coupled in the so-called Montel mirrors configuration. Alternatively if X-ray source 18 is a line focus source, the first monochromator 20 is a mirror curved in one direction to produce a 1D beam conditioning.

In the top view of FIG. 1a it can be seen that the first monochromator 20 is curved as an ellipse in the XY plane for focusing the beam in this plane on the distal X-ray detector 14 when placed in its SAXS measuring position at the longest sample to detector distance that can be larger than 1 meter and as large as 6 to 8 meters. The X-ray beam thus conditioned by the first monochromator 20 is further collimated by the two scatterless slits modules 24 that remove any parasitic scattering and attenuate the beam edge intensity to achieve a well controlled beam size at the distal X-ray detector 14. In order to prevent the generation of parasitic slit scattering each of the slit modules 24 has blades made of crystalline material (Si for Copper Kα radiation, Ge or GaAs for Mo Kα radiation or higher energies). The two slit modules 24 are spaced at a large distance apart, typically at a distance in the range of 80 cm to 1 or 2 meters depending on the maximum sample to detector distance of the system.

Furthermore also some WAXS signals can be measured in this configuration by moving the distal X-ray detector 14 inside the vacuum chamber 26 closer to the sample holder 16 along the Y direction.

On the other hand, in the dedicated WAXS configuration of the first embodiment of the X-ray scattering apparatus 10, as shown in FIGS. 1b, 2b and 3b, the motorized platform 36 is moved to a position such that the second X-ray source 30 and the associated second monochromator 32 are aligned with the main collimation tube 38.

The second monochromator 32 is chosen and set such as to focus the X-rays generated by the second X-ray source 30 as a second X-ray beam 42 onto a focal spot on or near the sample holder 16. WAXS signals scattered or diffracted from the sample are then detected by means of a proximal X-ray detector 44 located inside the vacuum chamber 26. In an embodiment of the invention WAXS signals scattered or diffracted from the sample can be collected by the distal X-ray detector 14 when it is placed close to the sample after moving along the propagation direction (Y).

In many cases the position of the sample holder 16 in the WAXS configuration is the same as in the SAXS configuration. However, this is not mandatory since the invention just requires that the second X-ray beam 42 is focused onto a focal spot on or near the sample holder 16 which also covers situations in which the sample holder 16 is moved inside the vacuum chamber 26 between a SAXS position and a WAXS position. Such movement of the sample holder 16 can essentially be along the Y direction but may also have an X and/or Z component.

The second X-ray source 30 can be a point focus source, and the second monochromator 32 can be adapted to focus the second X-ray beam 42 in two directions to produce a small spot on the sample or in its proximity. Proximity typically means distances of 100 mm or less from the sample in the Y direction, either before or after the sample, preferably less than 50 mm before or after the sample, and more preferably less than 25 mm before or after the sample The second X-ray beam delivery system 28 is adapted to produce a small spot on the sample since it is located close to the sample, just before the last (scatterless) slit module 24. As an example, the second X-ray source 30 can be located at a distance (P'1+P'2) of less than 700 mm from the sample, wherein P'1 is the distance from the second X-ray source 30 to the second monochromator 32, and P'2 is the distance from the second monochromator 32 to the focus produced by the second X-ray beam 42 on or near the sample holder 16. P'1 and P'2 are indicated by respective arrows in FIG. 1b. This arrangement allows to position a secondary multilayer optic with a small magnification factor, the magnification being given by the factor P'2/P'1.

By doing so it is possible, when using a microfocus sealed tube source, to achieve a spot size in the range of 200 microns or less with an order of magnitude higher intensity compared to the intensity achieved with the first monochromator 20.

With this co-linear SAXS/WAXS configuration of the X-ray scattering apparatus 10 according to the invention the second X-ray beam delivery system 28 produces a second X-ray beam 42 that is aligned with the beam path of the first X-ray beam 22. This provides the advantage of having the same propagation direction towards the sample which enables to use the same distal X-ray detector 14 or detector configurations with the distal X-ray detector 14 and the proximal X-ray detector 44 without the need to orient the detector(s) on a goniometer or motorized arm. It also enables to use the same sample orientation for 2D applications where specific scattering directions are investigated, e.g. when using a tensile stage inside the vacuum chamber 26 to stretch a sample without any need to have a second rotation stage on the sample. Moreover keeping the same inclination ensures an equivalent X-ray beam footprint on the sample which is important for mapping or small spot applications, e.g. micro-fluidics, since otherwise an additional inclination of the sample stage will be required as well as an orientation of the distal X-ray detector 14 to ensure the direct beam hits the distal X-ray detector 14 in case of a measurement with the focused beam.

The co-linear SAXS/WAXS design is also more advantageous if different sample positions are used in the apparatus 10 for scattering measurements, i.e when changing the sample to detector distance is done in part by moving the sample. This maintains the insertion module more simple with only a translation required to insert the second X-ray beam delivery system 28 without need to synchronize the translation with the movement of the sample. In any case it is preferred to realize the sample to detector distance change by moving the distal X-ray detector 14 so that the sample position is predefined and fixed for all experiments.

Moreover by using the co-linear SAXS/WAXS set-up one can use the second slit module 24 in the beam path of the first X-ray beam to also adjust the divergence of the focused second X-ray beam 42 generated by the second X-ray beam delivery system 28. This second slit module 24 can also be used together with distal X-ray detector 14 to control the intensity when switching from one configuration to the other and detect any potential need for realignment. A 1D scan of slit module 24 parallel to the translation direction could also be used to realign the slit module 24 and redefine the center of the beampath of the second X-ray beam 42 in order to realign the beamline for focusing measurements.

In some cases the main collimation tube 38 might include a Bonse Hart monochromator module comprising a motorized holder to position a channel cut monochromator in and out of the X-ray beam when respectively doing the USAXS or the SAXS measurement. This motorized Bonse Hart monochromator is associated to a Bonse Hart analyzer comprising a channel cut monochromator placed after the sample which can be placed in and out of the beam when respectively doing the USAXS or the SAXS measurement. The Bonse Hart monochromator module might be positioned upstream of the second X-ray beam delivery system 28, to ensure the second X-ray beam delivery system 28 is at the closest proximity of the second slit module 24.

Figure 4A:
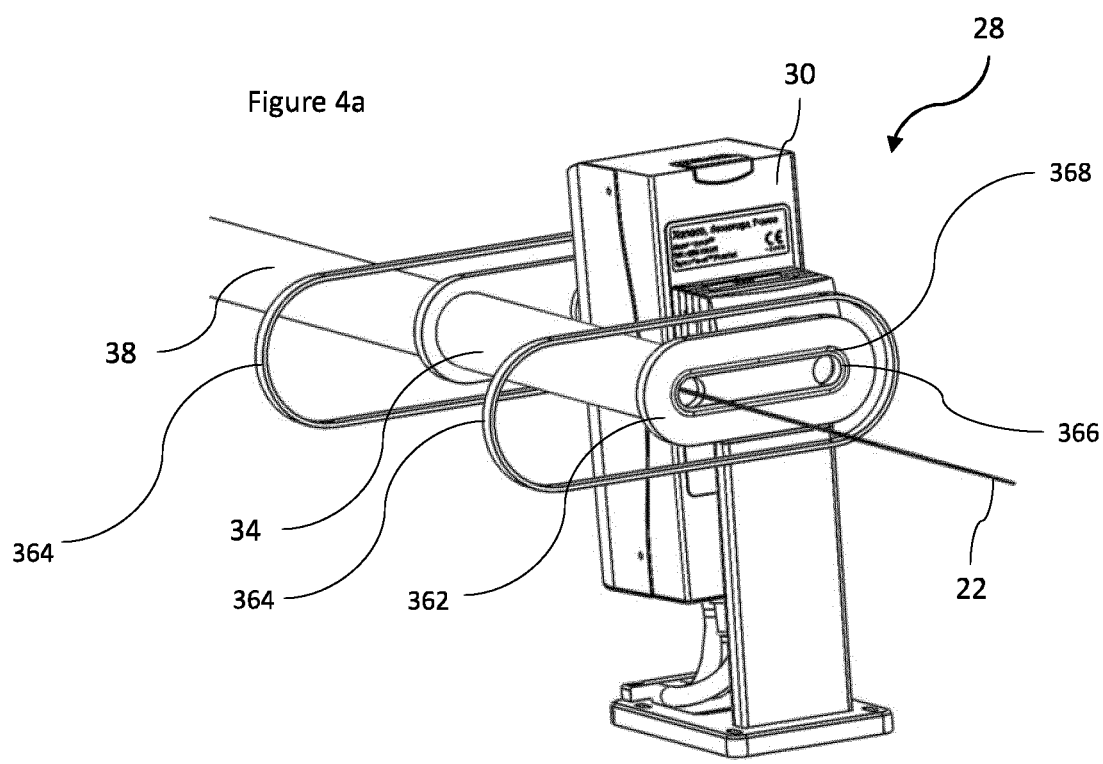

FIG. 4a shows an enlarged perspective view of the second X-ray beam delivery system 28 of the X-ray scattering apparatus 10 according to the invention in the SAXS configuration of FIGS. 1a, 2a and 3a. In this SAXS configuration the first X-ray beam 22 propagates through the main collimation tube 38 and the collimation tube extension 34 before reaching the second slit module 24.

Figure 4B:
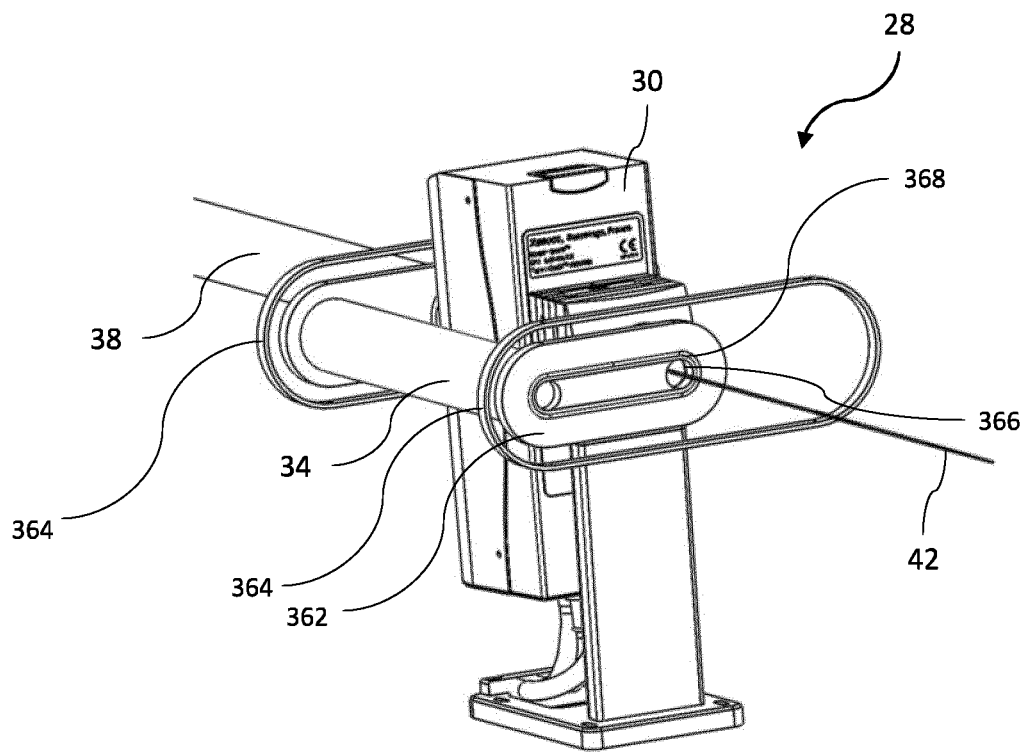
FIG. 4b shows an enlarged perspective view of a second X-ray beam delivery system of the X-ray scattering apparatus of FIG. 1b

FIG. 4b shows an enlarged perspective view of the second X-ray beam delivery system 28 in the WAXS configuration of FIGS. 1b, 2b and 3b. In this WAXS configuration the motorized platform 36 has positioned the second X-ray beam delivery system 28 comprising the second X-ray source 30 and the second monochromator 32 in the beam path downstream of the main collimation tube 38 and upstream of the second slit module 24. The second X-ray beam delivery system 28 is active, i.e. it produces the second X-ray beam 42 focused onto a focused spot on or near the sample holder 16.

As can be seen from FIGS. 4a and 4b, the downstream end of the main collimation tube 38 and the upstream end of the collimation tube extension 34 are provided with respective connection elements for vacuum-tight connection. These connection elements comprise sliding plates with vacuum-tight O-rings. The same holds true for the downstream end of the collimation tube extension 34 allowing for a vacuum-tight connection to the second slit module 24. This set-up ensures that the inside of the collimation tube extension 34 is in the same evacuated environment as the inside of the main collimation tube 38 either when the first X-ray beam delivery system 12 or the second X-ray beam delivery system 28 is active or during the change of configuration.

FIG. 4a shows a sliding plate 362 making the connection between the downstream end of the collimation tube extension 34 and the second slit module 24 through a connecting part 364 while ensuring vacuum tight connection. This sliding plate 362 also makes the connection between the second X-ray beam delivery system 28 and the second slit module 24 through the connecting part 364, also under vacuum tight connection. The vacuum tight connections are ensured by sliding seals 366, 368 which slide along the flat and smooth surface of connecting part 364 to ensure vacuum is kept inside the collimation tube extension 34 and inside the second beam delivery system 28 at any time. The sliding seals 366, 368 could comprise a superposition of O-rings and flat gaskets where for example a spring-loaded O-ring will press a low friction gasket onto the connecting part 364.

The connection between the two connecting parts 364 shown in FIGS. 4a and 4b, i.e. a first connecting part 364 at the downstream end of the main collimation tube 38 and a second connecting part 364 at the downstream end of the collimation tube extension 34, is done while ensuring a certain flexibility so that the respective sliding plates 362 can move without friction while maintaining the rigidity of the connection between the elements. For this purpose, the collimation tube extension 34 can be a rigid tube or alternatively a more flexible system combining bellows and more rigid parts. Alternatively, the collimation tube extension 34 can be provided with a retraction/expansion mechanism so that the collimation tube extension 34 or a part of it can then be retracted and expanded to facilitate the change of configuration.

In an alternative embodiment of the invention where the second X-ray beam delivery system 28 comprises a second X-ray source 30 and a second monochromator 32, this second X-ray beam delivery system 28 could be alternatively set in a fixed position at the entrance of the vacuum chamber 26 preferably with the focus of the second X-ray source 30 in the same horizontal plane XY than the first X-ray source 18. Such configuration typically requires an inclination of the second X-ray source 30 and second monochromator 32 with regards to the direction of the first X-ray beam 22 along Y direction. Such an embodiment of the invention would be adapted for high resolution WAXS measurement using a proximal X-ray detector 44 positioned in such a way that it can collect the X-ray beam scattered from the sample at wide angles. This dedicated measurement is preferably advantageous when the proximal X-ray detector 44 is a motorized detector that can be moved along the surface of the Ewald Sphere to measure scattering patterns scattered at wide angles either in the plane of incidence (YZ) or in a transversal direction.

The configuration shown in FIGS. 1b, 2b and 3b is suitable for WAXS measurements including high-resolution WAXS measurements but also for high spatial resolution SAXS measurements.

FIG. 5 shows a schematic representation of a second embodiment of an X-ray scattering apparatus 10 according to the invention. In this second embodiment the apparatus 10 only uses a single X-ray source, namely the first X-ray source 18, and the second X-ray beam delivery system 28 comprises an optic module and a positioning module configured to position the optic module into the first X-ray beam 22 at a position upstream of the sample holder 16. The optic module is configured to collect the first X-ray beam 22 and to convert it to the second X-ray beam 42 focused onto a focused spot on or near the sample holder 16.

FIG. 6 shows a schematic side view of the positioning module 46 and the optic module 48 used in the second embodiment of the invention. The optic module 48 can be a multilayer module, e.g. a multilayer mirror.

The positioning module 46 comprises a vacuum-fit motorized holder 50 that holds the optic module 48. The motorized holder 50 can be moved upwards and downwards along the vertical Z direction, as indicated by a dashed double arrow in FIG. 6. When moved to its lowermost position the first X-ray beam 22 is not affected by the positioning module 46, the optic module 48 or any other component of the second X-ray beam delivery system 28 and reaches the sample as shown in FIGS. 1a, 2a and 3a. Thus the lowermost position of the motorized holder 50 corresponds to the SAXS configuration of the x-ray scattering apparatus 10.

When the motorized holder 50 is moved upwards along the vertical Z direction it reaches a position where the optic module 48 intercepts the first x-ray beam 22. The optic module 48 is chosen and set such that it converts the first x-ray beam 22 to the second X-ray beam 42, e.g. by reflection or Bragg diffraction, and focuses it onto a focal spot on or near the sample. This is schematically shown in FIG. 5. When the first monochromator 20 has a shape of an ellipsoid of revolution, the optic module 48 can be shaped as a hyperboloid of revolution wherein the ellipsoid and the hyperboloid share one of their foci, the second focus of the hyperboloid being at the sample position, and the first focus of the ellipsoid being at the position of the first x-ray source 18.

Alternatively and as represented in FIG. 5, when the first monochromator 20 has the shape of a first paraboloid of revolution to produce a parallel or low divergence beam, the optic module 48 can have the shape of a second paraboloid of revolution to collect this parallel beam and convert it in a focused beam. The second X-ray beam 42 produces a spot size F2 with dimensions given by the ratio $M2=(P''_2/P1)*S1$, where $P''_2$ is the distance between the center of the optic module 48 and the focus of the second paraboloid of revolution defining the shape of the optic module 48, P1 is the distance between the first monochromator 20 and the focus of the first parabola defining its shape, and S1 is the size of the first X-ray source positioned at the focus of the first parabola. Taking into account the dimensions of the slit module 24, and the position of the sample holder 16 inside the vacuum chamber 26 the optic module 48 might have a different focal length than the first monochromator 20 as emphasized in FIG. 5, where the dimension of the spot size F2 in the plane of representation $F2_X$ is larger than the X-ray source size $S1_x$. In a preferred embodiment of the invention, the X-ray scattering apparatus 10 achieves a rather short distance between the optic module 48 and the sample, typically in the range of 30 to 40 cm or smaller. This ensures a magnification ratio M2 in the range of factor 3 or 4 maximum thus providing a spot size smaller than 200 microns when first X-ray source 18 is a microfocus sealed tube source taking into account any optical aberrations.

In order to facilitate the alignment of the optic module 48 the positioning module 46 may be equipped, in addition to the motorized holder 50, with an additional rotation stage for Bragg angle alignment and/or additional rotation or horizontal translation stages for optical alignment purposes. However the positioning module 46 is designed so that the motorized holder movements to select between the configuration with or without the optic module 48 do not impact the optical alignment settings of the optic module 48 which optical alignments are typically only done at installation or during periodic maintenance verifications.

In the example shown in FIG. 6 the positioning module 46 furthermore supports a channel cut incident monochromator 52 part of a Bonse-Hart USAXS module. The positioning module 46 is configured to either place the optic module 48 or the channel cut incident monochromator 52 in the incoming first x-ray beam 22. Placing the channel cut incident monochromator 52 in the first x-ray beam 22 requires moving the motorized holder 50 further upward.

In a preferred embodiment of the invention the motorized holder 50 is vacuum-fit, and the second X-ray beam delivery system 28 according to this second embodiment of the invention can be completely accommodated inside the main collimation tube 38 which can then extend all the way between the two slit modules 24.

FIG. 7 shows a schematic side view of another example of the invention in which the X-ray scattering apparatus 10 is furthermore equipped with an additional X-ray mirror, namely a deflection mirror 54 provided upstream of the sample holder 16. This mirror 54 is preferably a planar X-ray mirror to deflect the first X-ray beam 22 by an angular deviation 2θ where the angle θ is the incident angle on the mirror 54 such as to arrive on the surface of a sample 17 to be analyzed under grazing incidence in GISAXS while the surface of the sample 17 is maintained horizontal. This is particularly advantageous when the sample to be analyzed in a grazing incidence is a liquid. When the mirror 54 is used in total reflection geometry, an adjustment of the incidence control on the sample 17 is possible with a resolution given by the divergence of the incoming beam. This range of incidence angle control could be between >0° up to ~0.4° for Copper radiation to modify the incidence angle during an experiment or set a specific angle. In a preferred embodiment of the invention this deflecting mirror 54 could be part of the motorized holder 50 as an additional optional optical scheme.

FIG. 8 shows a top view of a modification of the first embodiment equipped with a third X-ray beam delivery system made of an imaging X-ray source 55 coupled to a primary slit module 56 placed on the motorized platform 36 to create an additional X-ray beam adapted for phase contrast imaging of the sample. Phase contrast X-ray imaging is particularly advantageous to image minute density differences inside soft materials and to overcome the contrast limits of traditional absorption X-ray imaging.

In order to perform phase contrast imaging, the imaging X-ray source 55 is a point focus source producing a polychromatic beam and is coupled to the primary slit module 56 to create a cone-shaped X-ray beam in direction of the sample holder 56 to be able to illuminate both the sample and a random structured object 57 typically positioned just in front of the sample. The imaging X-ray source 55 could be typically a source with a Tungsten or Molybdenum anode excited up to 50 kV, alternatively up to 70 kV, depending on the materials to be analyzed of small focus size, i.e. 50 microns focus or less, preferably of 10 microns or less. Alternatively, the imaging X-ray source 55 could comprise a Copper anode. The imaging characterization steps typically include measuring the speckle pattern created by the random structured object 57 on the distal detector 14 placed at a long distance without any sample in place to interfere with the propagated X-ray beam 58 and performing an additional exposure with the sample and random structured object 57 in place to record a sample induced distortion image of the speckle pattern on the distal detector 14 maintained at the same distance. By correlation analysis of speckle pattern with or without sample, a two dimensional phase map of the sample can be retrieved with a resolution depending on the size of speckles, i.e. the resolution of the features of the random structured object 57, but also the distal detector 14 pixel size and its distance to the sample. The random structured object 57 is a sample made of a random structure with small features and high X-ray intensity contrast and can for example be a sandpaper or cardboard. Alternative characterization sequence of this speckle X-ray imaging could include a scanning of speckle patterns with different lateral positions of the random structured object 57 with movement steps smaller than the speckle size to increase the spatial resolution.

X-ray speckle imaging is a particularly advantageous phase contrast imaging method as it does not require complex analyzer structures and reduces the requirements of spatial coherence for the sources to be used. By using an imaging X-ray source 55 with a mutualized insertion module as the one used for the second beam delivery system 28, the X-ray scattering apparatus as described in FIG. 8 can achieve SAXS and X-ray imaging with the same detection scheme. i.e. using a distal X-ray detector 14 adapted for easy, and preferentially motorized change of sample to detector distance over long distances. Generally X-ray imaging requires small pixel detectors than the hybrid pixel photon counting detectors used in SAXS which typically have a pixel size in the range of 75 μm for the smallest pixel size or as large as 172 μm to accommodate both detector size requirements, high counting rate (to be able to measure direct beam or high dynamic range signal), and low noise. The set-up according to the invention achieves high imaging magnification ratio given by the ratio S2/(S1) where S1 is the source to object distance and S2 is the source to imaging detector distance typically higher than a factor of 10. In another embodiment of the invention where the scattering apparatus 10 includes phase contrast imaging capability, the imaging X-ray source 55 and the primary slit module 56 are mounted on the sample chamber walls for example fixed on an additional incident beam port located on top or on the bottom of the port for incoming beam path of the primary incident beamline in order to shorten the distance to the sample for higher intensities and even larger imaging magnifications. In this case the change of measurement configuration from SAXS to phase contrast imaging includes change of position of the sample along Z direction coupled to an equivalent change of X-ray distal detector if required. Alternatively, as X-ray detectors used for SAXS are large detectors (>70×70 mm2 and could be as large >150×150 mm2) a vertical movement of the detector may not be necessary.

Combining SAXS and/or USAXS with phase contrast imaging could be particularly useful for inhomogeneous soft materials like clays, fibers, heterogenous nanocomposites where inhomogeneities could be first detected with the phase contrast imaging measuring method described here achieving a resolution in the order of few tens of microns or few microns and then probing in further details the nanostructure of the inhomogeneities with SAXS or USAXS measurement.

The X-ray generators used in the first X-ray source 18 and the second X-ray source 30 can comprise sealed tube X-ray sources, preferably microfocus sealed tube sources, or rotating anodes, preferably with a point focus, or liquid jet anodes.

A "focal spot" as used throughout the description and claims need not necessarily be point-like. It can also be line-shaped or generally have a 2D or 3D shape, depending on the respective sample and the intended X-ray scattering analysis.

The invention claimed is:

1. An X-ray scattering apparatus (10), comprising:
   a sample holder (16) for aligning and/or orienting a sample (17) to be analyzed by X-ray scattering;
   a first X-ray beam delivery system (12) comprising a first X-ray source (18) and a first monochromator (20) and being arranged upstream of the sample holder (16) for generating and directing a first X-ray beam (22) along a beam path in a propagation direction (Y) towards the sample holder (16);
   a distal X-ray detector (14) arranged downstream of the sample holder (16) and being movable, in particular in a motorized way, along the propagation direction (Y) such as to detect the first X-ray beam (22) and X-rays scattered at different scattering angles from the sample (17);
   wherein the first X-ray beam delivery system (12) is configured to focus the first X-ray beam (22) onto a focal spot on or near the distal X-ray detector (14) when placed at its largest distance from the sample holder (16) or to produce a parallel beam,
   characterized in that the X-ray scattering apparatus (10) further comprises a second X-ray beam delivery system (28) configured to focus a second X-ray beam (42) onto a focal spot on or near the sample holder (16);
   wherein the second X-ray beam delivery system (28) comprises a second X-ray source (30) and a second monochromator (32); and
   further comprising an insertion module (36) configured to move the second X-ray beam delivery system (28) into the first X-ray beam (22) at a position upstream of the sample holder (16).

2. The X-ray scattering apparatus (10) according to claim 1, further comprising a proximal X-ray detector (44) arranged downstream of the sample holder (16) such as to let the first X-ray beam (22) pass and detect X rays scattered from the sample (17).

3. The X-ray scattering apparatus (10) according to claim 1, further comprising a main collimation tube (38) extending along the beam path from a position downstream the first X-ray beam delivery system (12) to a position upstream the sample holder (16), wherein the insertion module (36) comprises a motorized platform (36) configured to alternatively position the second X-ray beam delivery system (28) or a collimation tube extension (34) into the beam path at a position between the main collimation tube (38) and the sample holder (16).

4. An X-ray scattering apparatus (10), comprising:
   a sample holder (16) for aligning and/or orienting a sample (17) to be analyzed by X-ray scattering;
   a first X-ray beam delivery system (12) comprising a first X-ray source (18) and a first monochromator (20) and being arranged upstream of the sample holder (16) for generating and directing a first X-ray beam (22) along a beam path in a propagation direction (Y) towards the sample holder (16);
   a distal X-ray detector (14) arranged downstream of the sample holder (16) and being movable, in particular in a motorized way, along the propagation direction (Y) such as to detect the first X-ray beam (22) and X-rays scattered at different scattering angles from the sample (17);
   wherein the first X-ray beam delivery system (12) is configured to focus the first X-ray beam (22) onto a focal spot on or near the distal X-ray detector (14) when placed at its largest distance from the sample holder (16) or to produce a parallel beam, characterized in that the X-ray scattering apparatus (10) further comprises a second X-ray beam delivery system (28) configured to focus a second X-ray beam (42) onto a focal spot on or near the sample holder (16); and wherein a connection of the second X-ray beam delivery system (28) to the beam path comprises connection elements (362, 364, 366, 368) for vacuum tight connection.

5. The X-ray scattering apparatus (10) according to claim 3, wherein the downstream end of the main collimation tube (38) and the upstream end of the collimation tube extension (34) are provided with respective connection elements (362, 364, 366, 368) for vacuum-tight connection.

6. The X-ray scattering apparatus (10) according to claim 3, wherein the collimation tube extension (34) is provided with a retraction/expansion mechanism.

7. The X-ray scattering apparatus (10) according to claim 1, further comprising a first and a second slit (24) located upstream of the sample holder (16) used in combination to shape the first X-ray beam (22), wherein the second slit (24) is located downstream of the second X-ray beam delivery system (28) to further shape the second X-ray beam (42), wherein a distance between the second slit (24) and the second X-ray beam delivery system (28) amounts to 5 cm or less.

\* \* \* \* \*